Jan. 23, 1934.  A. E. BOCK  1,944,208
MAGNETIC PLUG
Filed Feb. 20, 1932

Inventor
A. E. Bock
By *Arthur H. Sturges*
Attorney

Patented Jan. 23, 1934

1,944,208

UNITED STATES PATENT OFFICE 1,944,208

MAGNETIC PLUG

REISSUED

Albert E. Bock, Omaha, Nebr., assignor to Lisle Corporation, Clarinda, Iowa, a corporation of Iowa Application February 20, 1932. Serial No. 594,251

1 Claim. (Cl. 209—215)

This invention relates to the art of collecting, for subsequent removal of the ferrous, debris which becomes commingled with the lubricant within power transmission housing, incident to the wear of the moving parts or gears contained in said housing.

It is a particular object of the invention to provide a removable device for the drain plug openings of ferrous power transmission housings, the magnetic portion of the device to be spaced away from and out of contact with the ferrous housing so that the latter will not effect the influence of the magnet and prevent the most advantageous operation of the device.

A further object of the invention is to provide means whereby the magnetic core of the device may be readily, and economically secured in its carrying shell of non-magnetic material.

Other and further objects and advantages of the invention will be understood from the following detailed description reference being had to the accompanying drawing forming a part thereof and in which.

Figure 1:
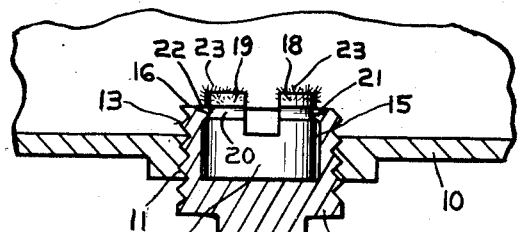
Figure 1 is a sectional view of a fragment of a power transmission housing or gear case and showing the new device applied to the drain plug opening thereof.
Figure 2:
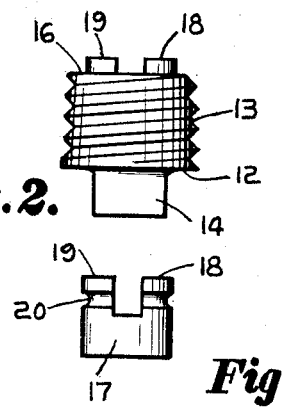
Figure 2 is a side elevation of the new drain plug.
Figure 3:
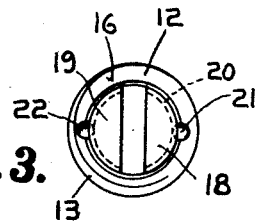
Figure 3 is a top plan view thereof.
Figures 4, 5:
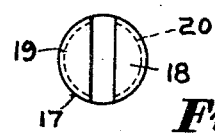
Figure 4 is a side elevation of a magnetic core employed.
Figure 5 is a top plan view of the core shown in Figure 4.

Referring now to the drawing for a more particular description, 10 indicates the bottom of a power transmission housing gear case or the like and 11 a threaded opening thereof which is provided for the purpose of draining refuse lubricant and debris from the interior of said housing.

The new device comprises a shell 12 formed of non-magnetic material and provided with exterior screw threads 13 upon the annular wall of the shell 12. A nut 14 is preferably formed integral with the body portion of the shell and the latter is provided with a recess 15 at the end of the shell opposite to said nut. As thus described it will be understood that an annular rim 16 is thus disposed concentrically about the opening 15.

A magnetic cylindrical core 17 is employed which in diameter is substantially equal to the diameter of the recess 15.

The core 17 is provided with a bifurcated end, whereby a north pole 18 and a south pole 19 is formed.

An annular groove 20 is provided for purposes later described upon the wall of the core.

The shell 12 is preferably formed of brass by casting, and as a result thereof the annular wall surrounding the recess 15 is rugose.

The magnetic core is preferably formed of tungsten metal or the like and preferably cut from elongated cylindrical rods of said material, the annular side wall, of the core 17 being rough and unfinished.

In order to lock the magnetic core to the non-magnetic shell, the former is placed in the recess 15 of the latter, the poles of the magnet preferably protruding slightly beyond the plane of the rim 16 of the shell. A punch is placed upon the rim and struck a sharp single blow with a hammer thereby peening a portion or tongue 21 of the rim 16 into the groove 20 of the core. Preferably a second portion of the rim 16 and opposite to the member 21 is peened into the groove 20 as indicated at 22. The second tongue 22 may be dispensed with in instances where a close fit is provided between the core and the interior of the shell. It will be understood that it is essential to rigidly and securely lock the core and the shell together whereby the core will be prevented from moving away from the shell and intermingling with the moving gears within the transmission housing.

In operation the new device when placed in a drain opening of a housing will attract and detain particles of metal contained within the lubricant of the housing as indicated at 23 and it will be noted that the magnetic core 17 is not in direct contact with the housing, being spaced therefrom by means of the non-magnetic shell 12 which is positioned between the core and the housing.

Figure 6:
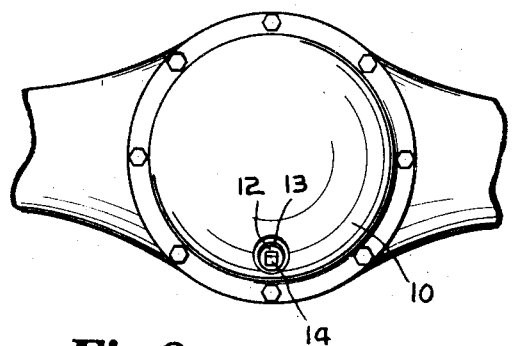
Figure 6 is a side elevation of the central portion of a differential gear-housing and showing the new device applied thereto.
Figure 7:
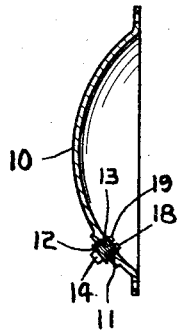
Figure 7 is a vertical section of a removable cover plate for the housing shown in Figure 6 and illustrating the applicability of the new device to the plate.

It will be understood that the new device is applied to the bottom of a transmission housing and may be applied to a rear axle housing, as shown in Figures 6 and 7.

From the foregoing description it is thought to be obvious that a magnetic grease plug constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as herein claimed.

I claim:

A drain plug for power transmission housings and the like having a threaded drain opening therein, comprising a non-magnetic shell exteriorly threaded for engagement in a transmission housing drain opening and having an integral nut on its outer end for turning the shell to remove and position the same, said shell having a recess in its inner end opposite said nut providing an annular rim on the shell adapted to project through and beyond the opening in the transmission housing, a magnetic core fitting in the recess in the shell, said core having a bifurcated projecting end extending beyond the shell and providing opposite poles for the core and having an annular exterior groove in register with the projecting end of the shell, said rim having an inwardly offset portion projecting into said groove for interlocking the core in the shell.

ALBERT E. BOCK.